(12) United States Patent
Walter

(10) Patent No.: US 9,725,044 B2
(45) Date of Patent: Aug. 8, 2017

(54) PROTECTIVE DEVICE FOR A VEHICLE INTERIOR

(71) Applicant: Herbert Walter, Ebersbach (DE)

(72) Inventor: Herbert Walter, Ebersbach (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/131,625

(22) Filed: Apr. 18, 2016

(65) Prior Publication Data

US 2016/0325687 A1 Nov. 10, 2016

(30) Foreign Application Priority Data

May 8, 2015 (DE) .......................... 10 2015 208 627

(51) Int. Cl.
*B60R 5/04* (2006.01)
*B60J 1/20* (2006.01)

(52) U.S. Cl.
CPC ............ *B60R 5/047* (2013.01); *B60J 1/2022* (2013.01); *B60J 1/2027* (2013.01)

(58) Field of Classification Search
CPC ....... B60R 5/047; B60J 1/2013; B60J 1/2022; B60J 1/2027
USPC ......................................................... 160/265
See application file for complete search history.

(56) References Cited

U.S. PATENT DOCUMENTS

| | | | |
|---|---|---|---|
| 6,086,133 A * | 7/2000 | Alonso | .................. B60J 1/2019 160/23.1 |
| 6,416,103 B1 | 7/2002 | Laudenbach et al. | |
| 6,918,623 B2 | 7/2005 | Hansen et al. | |
| 7,252,321 B2 * | 8/2007 | Lee | ......................... B60J 1/2025 160/370.22 |
| 2003/0141734 A1 | 7/2003 | Schmidt | |

(Continued)

FOREIGN PATENT DOCUMENTS

| | | |
|---|---|---|
| DE | 009302614 U1 * | 4/1993 |
| DE | 199 44 948 C1 | 5/2001 |

(Continued)

OTHER PUBLICATIONS

Search Report of European Patent Office issued in Application No. 16158564 with English translation of category of cited documents dated Oct. 6, 2016 (7 pages).

(Continued)

*Primary Examiner* — Blair M Johnson
(74) *Attorney, Agent, or Firm* — Flynn, Thiel, Boutell & Tanis, P.C.

(57) ABSTRACT

A protective device for a vehicle interior including a flexible structure held on a winding shaft and mounted for movement between a rest position, wound-up on the winding shaft, and a pulled-out protective position. Guiding members are provided in an end face region, which members are connectable to a drive system having a drive motor and a drive transmission connected to the guiding members in order to cause synchronous displacement of both guiding members. The drive transmission includes a revolving pull drive mechanism on one side, which drive mechanism is connected to one guiding member and is driven by the drive motor. The other guiding member is displaceable by a push-pull cord capable of translational movement, which cord is coupled to the revolving pull drive mechanism.

13 Claims, 1 Drawing Sheet

(56) References Cited

U.S. PATENT DOCUMENTS

2004/0021332 A1    2/2004  Hansen et al.
2016/0325687 A1*  11/2016  Walter .................... B60R 5/047

FOREIGN PATENT DOCUMENTS

| DE | 102 03 743 A1 | 8/2003 |
| DE | 10 2006 015 646 A1 | 10/2007 |
| DE | 10 2007 040 282 A1 | 2/2009 |
| EP | 1 386 784 A1 | 2/2004 |
| EP | 1747923 A2 * | 1/2007 |
| EP | 1787864 A1 * | 5/2007 |

OTHER PUBLICATIONS

Office Action of German Patent Office issued in Application No. 10 2015 208 627.5 dated Oct. 26, 2015 (5 pages).

* cited by examiner

PROTECTIVE DEVICE FOR A VEHICLE INTERIOR

CROSS-REFERENCE TO RELATED APPLICATIONS

This claims priority from German Patent Application No. 10 2015 208 627.5, filed on May 8, 2015, the disclosure of which is hereby incorporated by reference in its entirety into this application.

FIELD OF THE INVENTION

The invention relates to a protective device for a vehicle interior, comprising a flexible two-dimensional structure which is held on a winding shaft and is mounted to be movable between a rest position, wound-up on the winding shaft, and at least one pulled-out protective position, and which is provided with a respective guiding member on each of opposite sides in an end face region that is in front in the pull-out direction, said members being connectable to a drive system which comprises a drive motor and drive transmission means connected to the guiding members in order to cause synchronous displacement of both guiding members.

BACKGROUND OF THE INVENTION

Such a protective device in the form of a covering for a loading compartment of a passenger automotive vehicle is disclosed in DE 199 44 948 C1. Such a loading compartment covering has a cover tarpaulin as a flexible two-dimensional structure which is held on a rotatable winding shaft to be wound up and wound off. The winding shaft is mounted in a cartridge housing which, in the installed condition, is oriented in the transverse direction of the vehicle within the loading compartment and positioned behind a rear seat bench of the vehicle interior. The cover tarpaulin has a dimensionally stable pull-out profile on the end face region that is in front in the pull-out direction, which profile is provided with a respective guiding pin on each of opposite sides thereof, the pins projecting laterally outwards beyond the cover tarpaulin. On opposite side walls of the loading compartment a respective guiding rail is provided and a cam is slidingly guided therein for translational movement. The cams are intended to receive the guiding pins of the pull-out profile and thereby to transfer the cover tarpaulin from a rest position to a protective position and return it back again. The two cams are connected to a drive motor via drive transmission means in the form of push-pull cords, wherein the motor is disposed centrally and drives both the drive transmission means synchronously.

SUMMARY OF THE INVENTION

An object of the invention is to provide a protective device of the above mentioned type, which allows simple installation within an automotive vehicle and has a fail-safe design.

The object is achieved in that the drive transmission means include a revolving pull drive mechanism on one side, which drive mechanism is connected to one guiding member and is driven by the drive motor, and in that the opposite guiding member is displaceable by a push-pull cord capable of translational movement, which cord is coupled to the revolving pull drive mechanism and guided to the guiding member. The protective device according to the invention is used for shading of side window and rear window panes and of glass roof areas, and also, for instance, as a protective covering to be pulled out horizontally and, for instance, as protective partitioning to be pulled out vertically for a loading compartment of a passenger automotive vehicle, which is open towards a passenger compartment within a vehicle interior. The pull drive mechanism provided is preferably a cable drive or a belt drive. A belt drive comprises non-positively (force-fit) or positively (form-fit) acting belts, like V-belts or toothed belts. The revolving pull drive mechanism is characterized in that the corresponding pulling means, that is, in particular the cable or the belt, are closed and revolve over two mutually spaced deflection pulleys, whereby two pulling means branches moving in opposite directions are obtained. Therein, a cable or a belt can also have an open design and with its opposite ends be fixed to one or to both of the deflection pulleys. However, for that purpose, the cable or belt has to be laid between the deflecting pulleys such that the two branches moving in opposite directions are obtained. Owing to the solution according to the invention, the pull drive mechanism can be disposed together with the drive motor laterally within the vehicle interior and, in particular be supplied as a pre-assembled unit together with corresponding guiding rails of the protective device to be installed in the vehicle. The push-pull cord can be laid out within the automotive vehicle during assembly in the vehicle in a simple manner and be led to the opposite side of the protective device.

In an embodiment of the invention, the push-pull cord is connected to the guiding member on one end region and to a branch of the revolving pull drive mechanism on an opposite end region. By corresponding deflection of the push-pull cord, there is synchronous parallel displacement of the two guiding members of the face end region of the flexible two-dimensional structure, in spite of counter-acting movement of the two branches of the pull drive mechanism, and namely, depending on the direction of rotation of the closed, revolving pull drive mechanism, in the direction towards the rest position or in the direction towards the protective position of the two-dimensional structure.

In a further embodiment of the invention, the push-pull cord can be designed as a flexible push-pull profile which is guided in a guiding track fixed in location and provided with at least one curvature. The guiding track preferably is designed as a guiding channel, guiding groove, guiding hose, or guiding tube. In the ready-for-use installed condition, the guiding track is disposed within the vehicle interior and fixed in location. The push-pull cord slides within the guiding track. Within the guiding track, the push-pull cord can be displaced in both directions by translational movement.

In a further embodiment of the invention, one guiding member of the end face region of the flexible two-dimensional structure is connected to a first branch of the revolving pull drive mechanism, and the opposite guiding member of the end face region of the flexible two-dimensional structure is connected to a second branch, moving in a direction opposite to that of the first branch, via the push-pull cord. Owing to the deflection using the push-pull cord, synchronous and parallel displacement of both guiding members of the two-dimensional structure is ensured.

BRIEF DESCRIPTION OF THE DRAWINGS

Further advantages and features of the invention will become apparent from the claims and from the description below of a preferred exemplary embodiment of the invention which is illustrated with reference to the drawings.

DETAILED DESCRIPTION

Figure 1:
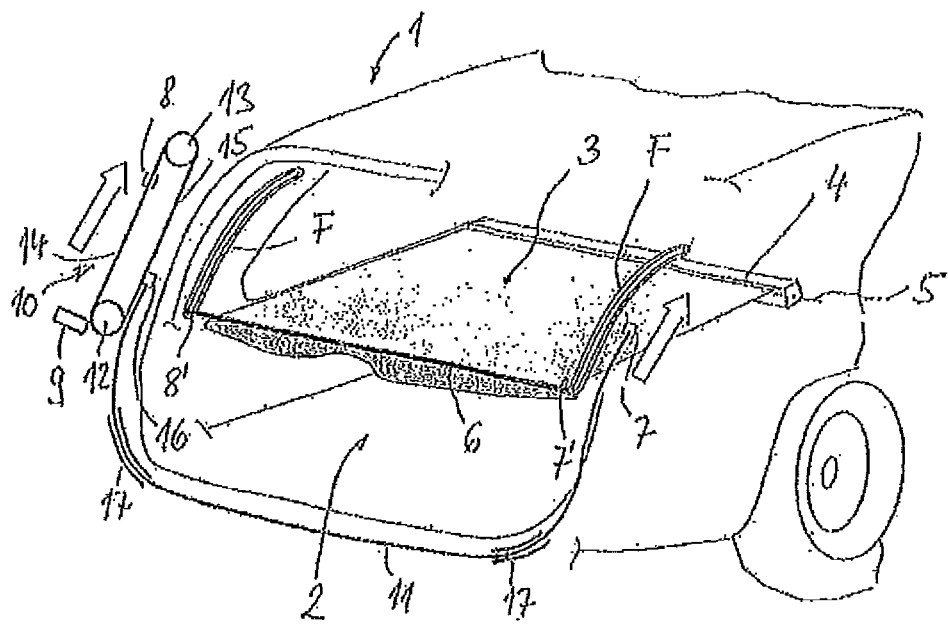
FIG. 1 shows schematically in a perspective view an embodiment of a protective device according to the invention in the form of a loading compartment covering for a passenger vehicle.

A passenger vehicle 1 according to FIG. 1 is designed as a station wagon or estate passenger vehicle with the loading compartment 2 thereof disposed within a vehicle interior behind a passenger compartment. The loading compartment 2 is delimited towards the front by a backrest arrangement of a rear seat bench in a manner not illustrated in more detail. Towards the rear, the loading compartment 2 is delimited by a back door (not illustrated) of the passenger vehicle 1.

For approximately horizontal covering of the loading compartment 2 on a level with a vehicle railing, a protective device in the form of a loading compartment covering is provided, which includes a flexible two-dimensional structure 3. The flexible two-dimensional or thin, substantially planar structure 3 is designed as a cover tarpaulin and is held on a winding shaft 5 (illustrated merely by a dot-and-dash line) to be wound up and wound off. The winding shaft 5 is rotatably mounted in a cartridge housing 4 which is fixed in retainers on the vehicle side (not illustrated in more detail) in the transverse direction of the vehicle within the loading compartment immediately behind the backrest arrangement. The flexible two-dimensional structure 3 is movable between a rest position, wound-up on the winding shaft 5 and stowed in the cartridge housing 4, and a protective position pulled-out backwards towards the rear of the vehicle. For that purpose, the flexible two-dimensional structure 3 has a dimensionally stable or substantially rigid pull-out profile 6 located on an end face region 6a of the flexible structure 3 that is in front in the pull-out direction. The profile 6 is connectable to a respective guiding member 7, 8 on the opposite end faces 7', 8' thereof, wherein the guiding members 7, 8 are designed as cams for the opposite end faces 7', 8' of the pull-out profile 6. The flexible structure 3 has laterally-spaced side portions or regions 6b and 6c oriented transversely to the end face region 6a. The guiding members 7, 8 are displaceable for translational movement within guiding rails F fixed to the vehicle. The guiding rails F extend, in the exemplary embodiment as illustrated, along vehicle body pillars on the rear side of the passenger vehicle starting from the level of the vehicle railing obliquely upwards and towards the front in the longitudinal direction of the vehicle. The guiding rails F are fixed to the vehicle and connected to a corresponding body frame structure of the passenger vehicle, and preferably are integral with corresponding body pillar panelings of the vehicle interior. The pull-out profile 6 is movable along said guiding rails F between the horizontal protective condition, as illustrated in FIG. 1, and an obliquely upwards and forwards displaced protective condition in order to allow convenient access to the bottom of the loading compartment 2 upon opening the back door. Upon reclosing the back door, the pull-out profile 6 moves back again to its lower position according to FIG. 1.

For moving the pull-out profile 6 between said two different positions within the guiding rails F a drive system is provided, comprising a drive motor 9 in the form of an electric motor and drive transmission means, which are embodied by a closed revolving pull drive mechanism 10, on the one hand side, and a push-pull cord 11 capable of translational movement, on the other hand side. The push-pull cord 11 is guided in a guiding track 17 to be slidable in a translational motion or along a translational movement path, which track is designed as a guiding tube. The guiding track 17 is installed fixed to the vehicle. The pull drive mechanism 10 is implemented by a closed revolving cable line. The cable line includes a first deflection pulley 12 and a second deflection pulley 13 which are spaced from each other. The closed revolving cable line includes a first cable branch 14 and an opposite second cable branch 15. The pull drive mechanism 10 including the drive motor 9 is fixed in the vicinity of the left hand side guiding rail F to the vehicle body frame structure along the left rear-side body pillar, as seen in the normal direction of travel of the passenger vehicle 1. The drive motor 9 acts on the deflection pulley 12 and, thus, drives the pull drive mechanism 10 in both directions of rotation. A first guiding member 8 is connected to the first cable branch 14, whereas a guiding element 16 is fixed to the second cable branch 15. Owing to the movements in opposite directions of the two cable branches 14, 15 the elements 8 and 16, fixedly connected to the cable branches 14, 15, that is, the guiding member 8 and the guiding element 16, necessarily also move in mutually opposed directions. The guiding element 16 is connected to an end region of the push-pull cord 11, with the opposite end region thereof connected to the guiding member 7, which member is slidingly guided for translational movement in the opposite guiding rail F. The push-pull cord 11 is led via the guiding track 17 from the one side of the loading compartment 2 to the opposite side of the loading compartment 2, whereby the push-pull cord 11 is deflected twice by 90° and as a result by 180°, between one end region and the other end region thereof.

Figure 2:
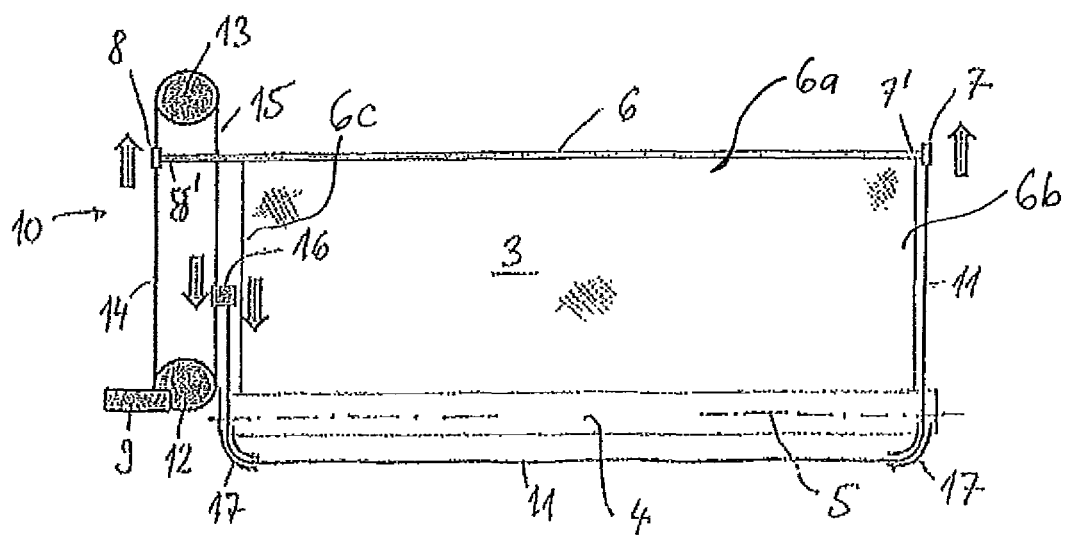
FIG. 2 shows schematically in a plan view the protective device according to FIG. 1.

Once the opposite end faces 7', 8' are fixed in the corresponding guiding members 7, 8 in the opposite guiding rails F, activation of the drive motor 9 necessarily causes rotational movement of the closed, revolving pull drive mechanism 10, whereby the guiding member 8 and the guiding element 16 are moved in opposite directions according to the directions of the arrows in FIG. 2. The movement of the guiding element 16 is transmitted via the push-pull cord 11 to the opposite side of the two-dimensional structure 3, where the end region of the push-pull cord 11 is connected to the guiding member 7 which guides the end face 7' of the pull-out profile 6. With reference to the arrows related to the push-pull cord 11 in FIG. 2, it is apparent that the opposite end faces 7', 8' of the pull-out profile 6 are moved in the same direction upon activation of the drive motor 9. As a result, displacement of the pull-out profile 6 is largely in parallel to a rotational axis of the winding shaft 5 so that the two-dimensional structure 3 is pulled out of or drawn into the cartridge housing 4 at least largely in parallel.

Consequently, the pull drive mechanism 10 constitutes the active drive component for displacement of the two-dimensional structure 3, whereas the push-pull cord 11 and, thus, the opposite side of the pull-out profile 6 are passively entrained.

The drive system according to FIG. 2 can, as an alternative to the embodiment according to 1, also be provided in order to transfer the two-dimensional structure 3 from its rest position, completely wound-up on the winding shaft 5, to its completely pulled-out protective position. For that purpose, the pull drive mechanism 10 and the push-pull cord 11 of correspondingly straight running guiding rails are dimensioned and extended over the entire pull-out length of the two-dimensional structure 3. The guiding rails, which may be designed analogous to the guiding rails F, but be embodied in a straight design, are omitted in FIG. 2 for reasons of clear arrangement. For the rest, said embodiment is correspondent to the embodiment as described above with reference to FIGS. 1 and 2.

The invention claimed is:

1. A protective device for a vehicle interior, comprising:
 a winding shaft;
 a flexible covering structure mounted on said winding shaft for movement between a rest position in which said flexible covering structure is wound around said winding shaft and at least one extended protective position in which said flexible covering structure is partially unwound from said winding shaft, said flexible covering structure having first and second laterally-spaced sides oriented transversely to said winding shaft and an end region oriented transversely to said first and second sides, said end region being spaced remotely from said winding shaft when said flexible covering structure is disposed in said at least one extended protective position;
 a first guiding member fixed to said first side of said flexible covering structure adjacent said end region thereof and a second guiding member fixed to said second side of said flexible covering structure adjacent to said end region thereof; and
 a drive system comprising a drive motor and a drive transmission arrangement operatively connecting said drive motor to said first and second guiding members to cause synchronous displacement thereof, said drive transmission arrangement including a revolving pull drive mechanism connected to said first guiding member, said drive motor being drivingly connected to said revolving pull drive mechanism, both said drive motor and said revolving pull drive mechanism being disposed closely adjacent to said first side of said flexible covering structure and closer to said first side than to said second side, said drive transmission arrangement further including a push-pull element guidingly mounted for movement along a translational path leading to said second guide member, said second guide member being connected to and displaceably movable by said push-pull element, said push-pull element being coupled to said revolving pull drive mechanism.

2. The protective device of claim 1, wherein said revolving pull drive mechanism has a first branch mounted for movement in a first direction and a second branch mounted for movement in a second direction opposite to the first direction, said first guiding member being connected to said first branch for movement therewith and said push-pull element connecting said second guiding member to said second branch for movement therewith.

3. The protective device of claim 2, wherein said push-pull element has a first end region connected to said second guiding member and a second end region connected to said second branch.

4. The protective device of claim 3, further including a guide track fixedly disposed relative to said flexible covering structure and defining the translational path, said push-pull element comprising a flexible material and being guidingly mounted within said guide track for movement along the translational path, said guide track extending from said first side of said flexible covering structure to said second side of said flexible covering structure.

5. The protective device of claim 4, wherein said guide track is configured to have at least one curved region defining a curved portion of the translational path.

6. The protective device of claim 4, wherein said guide track is substantially U-shaped and includes two curved regions defining respective curved portions of the translational path which cause respective changes in a direction of movement of said push-pull element as same moves along the translational path.

7. The protective device of claim 2, wherein said revolving pull drive mechanism includes a closed cable and a pair of spaced-apart pulley elements, said cable including said first and second branches and being disposed in surrounding relation with said pulley elements, said first and second branches extending between said pulley elements and being oriented substantially parallel with one another on opposite sides of said pulley elements, said drive motor being drivingly connected to one of said pulley elements.

8. The protective device of claim 1, wherein said flexible covering structure has a central region disposed between said first and second sides at substantially equal distances therefrom, and both said drive motor and said revolving pull drive mechanism are disposed closely adjacent said first side of said flexible covering structure and at a substantial distance from said central region thereof.

9. A protective device for a vehicle interior, comprising:
 a winding shaft defining a rotational axis;
 a flexible and substantially planar covering structure having a first end portion fixed to said winding shaft and a second end portion spaced from said first end portion, said covering structure being mounted on said winding shaft for movement between a retracted position in which said covering structure is wound at least partially around said winding shaft and an extended position in which said covering structure is at least partially unwound from said winding shaft and said second end portion is disposed remotely therefrom, said covering structure having first and second side portions oriented transversely to said first and second end portions and oriented in a spaced-apart manner relative to one another with respect to a width direction of a vehicle interior, said covering structure having a central region disposed between said first and second side portions at-substantially equal distances therefrom;
 first and second guide members respectively mounted on said first and second side portions of said covering structure closely adjacent said second end portion thereof; and
 a drive arrangement including a drive motor and a drive transmission operatively connecting said drive motor to said first and second guide members for synchronous movement thereof, said drive transmission including a revolving drive mechanism connected to said first guide member and driven by said drive motor, both said drive motor and said drive mechanism being disposed closely adjacent said first side portion of said covering structure and at a substantial distance from said central region thereof, said drive transmission including a push-pull element mounted for translational movement along a translational path, said push-pull element being connected to and driven by said drive mechanism and connected to said second guide member on said second side portion of said covering structure to displace said second guide member synchronously with said first guide member.

10. The protective device of claim 9, wherein said drive mechanism includes a closed cable having a first cable branch mounted for movement in a first direction and a second cable branch mounted for movement in a second direction opposite the first direction, said first guide member being connected to said first cable branch for movement therewith and said push-pull element interconnecting said second cable branch to said second guide member for movement therewith.

11. The protective device of claim of claim 10, further including a guide track defining the translational path, said push-pull element comprising an elongate and flexible member mounted within said guide track for movement along the translational path, said guide track having a plurality of curved regions each defining a curved portion of the translational path which cause respective changes of direction in a direction of movement of said push-pull element as same moves along the translational path.

12. The protective device of claim 11, wherein said push-pull element has a first end connected to said second guide member and a second end connected to said second cable branch, and said guide track has a substantially U-shaped configuration and extends from said first side of said covering structure to said second side thereof.

13. The protective device of claim 12, wherein said drive mechanism includes a pair of spaced-apart pulley elements, said cable being disposed in surrounding relation with said pulley elements, said first and second cable branches extending between said pulley elements and being oriented substantially parallel with one another on opposite sides of said pulley elements, said drive motor being drivingly connected to one of said pulley elements.

\* \* \* \* \*